US006744859B1

(12) United States Patent
Koepke et al.

(10) Patent No.: US 6,744,859 B1
(45) Date of Patent: Jun. 1, 2004

(54) SYSTEM AND APPARATUS FOR PROVIDING TELEPHONE COMMUNICATION BETWEEN A CALLER AND A SPECIAL NUMBER CALL ANSWERING FACILITY

(75) Inventors: Michael Arthur Koepke, Geneva, IL (US); Christopher Fairol Robbins, Wheaton, IL (US); Michael Francis Friedrich, Shorewood, IL (US); Eileen Kaye Boroski, Elmhurst, IL (US); Mary Alice Boyd, Comanche, TX (US); Gregory Allen Nemec, Batavia, IL (US)

(73) Assignee: Intrado Inc., Longmont, CO (US)

( * ) Notice: Subject to any disclaimer, the term of this patent is extended or adjusted under 35 U.S.C. 154(b) by 227 days.

(21) Appl. No.: 10/152,113

(22) Filed: May 21, 2002

(51) Int. Cl.$^7$ .............................................. H04M 11/04
(52) U.S. Cl. ............................. 379/45; 379/49; 379/37; 379/265.01
(58) Field of Search ....................... 379/37–51, 142.1, 379/207.15, 207.02, 216.01, 265.01, 266.02, 93.14, 93.15

(56) References Cited

U.S. PATENT DOCUMENTS

| 5,311,569 A | | 5/1994 | Brozovich et al. |
| 6,101,240 A | | 8/2000 | Blair et al. |
| 6,104,784 A | * | 8/2000 | Robbins ...................... 379/45 |
| 6,415,018 B1 | * | 7/2002 | Antonucci et al. ............ 379/45 |

\* cited by examiner

Primary Examiner—Wing Fu Chan
(74) Attorney, Agent, or Firm—Law Office of Donald D. Mondul

(57) ABSTRACT

A system is for providing communication between a caller and a special number call answering facility including call answering positions. Calls are in a first call format including caller identification information or a second call format without identification information. The system includes: (a) A first switch coupled with a special number switch in a network. The first switch receives a first call in the first format, converts the first call to an interim call maintaining the identification information in the second call format and presents the interim call at an output. (B) A second switch coupled with the call answering facility, coupled with the first switch and coupled with an administrative number switch in the network. The second switch receives the second call in the second format and the interim call and distributes the calls among the call answering positions.

17 Claims, 6 Drawing Sheets

FIG. 2
(PRIOR ART)

SYSTEM AND APPARATUS FOR PROVIDING TELEPHONE COMMUNICATION BETWEEN A CALLER AND A SPECIAL NUMBER CALL ANSWERING FACILITY

BACKGROUND OF THE INVENTION

The present invention is directed to telecommunication systems, and especially to abbreviated or special number telecommunication systems, such as abbreviated number emergency services notification and dispatch operation telecommunication systems. One example of such an abbreviated or special number is the emergency services notification and dispatch system commonly known as the 9-1-1 system in the United States.

Emergency services notification and dispatch operations, commonly known in the United States as 9-1-1 Service, has its genesis in a 1957 recommendation by the National Association of Fire Chiefs for a single number for reporting fires. In 1967, the President's Commission on Law Enforcement and Administration of Justice recommended that a single number should be established nationwide for reporting emergency situations. The use of different telephone numbers for different types of emergencies was considered to be contrary to the purpose of using a single, universal emergency notification number. Other federal agencies and several government officials supported and encouraged the recommendation. The President's Commission on Civil Disorders charged the Federal Communications Commission (FCC) with finding a solution. In November 1967, the FCC met with the American Telephone and Telegraph Company (AT&T) to establish a universal number that could be implemented quickly. In 1968, AT&T announced the establishment of the number 9-1-1 as the emergency notification number nationwide. The 9-1-1 code was chosen because it was considered to be brief, easily remembered, and could be dialed quickly. It was also a unique number that had never been employed as an office code, area code or service code, and it met long range numbering plans and switching configurations of the telecommunication industry. The 9-1-1 number met the requirements of all parties, in government and in private industry.

Congress supported the AT&T plan and passed legislation allowing use of only the numbers 9-1-1 when creating an emergency calling service. The 9-1-1 number was thus established as a nationwide standard emergency number. The first 9-1-1 call in the United States was completed by Senator Rankin Fite in Haleyville, Ala., using the Alabama Telephone Company. Nome, Ak. Implemented 9-1-1 service in February 1968.

In 1973, The White House Office of Telecommunication issued a policy statement recognizing the benefits of 9-1-1, encouraging the nationwide adoption of 9-1-1, and establishing a Federal Information Center to assist governmental units in planning and implementing 9-1-1 service.

A basic 9-1-1 System provides for programming with special 9-1-1 software a telephone company end office (also known as a "central office" or a "Class 5 office") to route all 9-1-1 calls to a single destination. The single destination was termed a Public Safety Answering Point (PSAP). In such an arrangement, all telephones served by the central office would have their 9-1-1 calls completed to the PSAP. However, the areas served by respective telephone company central offices do not line up with the political jurisdictions that determine the boundaries for which PSAP may be responsible. That is, a municipal fire department or police department may geographically include an area outside the area served by the central office, a condition known as underlap. Likewise, the municipal fire or police department may encompass an area of responsibility that is less expansive than the area served by the central office, a situation known as overlap. Further, the original basic 9-1-1 systems did not provide any identification of the caller; the PSAP human operator had to obtain such information verbally over the line after the call was connected. The major shortcoming of the basic 9-1-1 systems was that they could not support interconnection to other telecommunication providers such as independent telephone service companies, alternate local exchange carriers (ALECs), or wireless carriers. The "basic" nature of the basic 9-1-1 system also indicates that the system does not have Automatic Location Identification (ALI) capability or Automatic Number Identification (ANI) capability with a call back capability.

Similar abbreviated number systems are in place for handling emergency service calls in countries other than the United States. The abbreviated number system established in Canada is the foreign system most similar to the system established in the United States. There are other abbreviated number calling systems in place in the United States and abroad for such purposes as handling municipal information and services calls (3-1-1) and for other purposes. All of these special or abbreviated number call systems that have geographic-based content suffer from similar shortcomings in their abilities to automatically place incoming calls to an action-response facility geographically proximate to the locus of the caller. It is for this reason that the 9-1-1 emergency call system of the United States is employed for purposes of this application as a preferred embodiment of the system and apparatus of the present invention.

Automatic Number Identification (ANI) is a feature for 9-1-1 services that allows the caller's telephone number to be delivered with the call and displayed at the PSAP. This ANI feature is sometimes referred to as Calling Party Number (CPN). The feature is useful for identifying the caller and, if the caller cannot communicate, for callback. A signaling scheme known as Centralized Automatic Message Accounting (CAMA), originally used to identify the originator of a long distance call for billing purposes, was adapted to facilitate ANI delivery to the PSAP. CAMA uses multi-frequency (MF) signaling to deliver 8 digits to the PSAP. The first digit (called the Number Plan Digit-NPD) specifies one of four possible area codes. Digits 2–8 represent the caller's 7-digit telephone number. The ANI is framed with a key pulse (KP) at the beginning and a start (ST) at the end in the format: KP-NPD-NXX-XXXX-ST.

The multi-frequency (MF) signaling used in connection with the ANI feature (referred to herein as Enhanced MF signaling) is not the same as the Dual Tone Multi-Frequency (DTMF) signaling also encountered in telecommunication systems. Both signaling schemes use a combination of two specific tones to represent a character, or digit, but the tones are different. There are 16 DTMF tones (0–9, #, *, A, B, C, D); there are a greater number of MF tones (including 0–9, KP, ST, ST', ST", and others). DTMF tones represent signals from a user to a network; MF tones are control signals within the network. An enhanced MF arrangement has recently been used in connection with 10-digit wireless telephone systems.

The original 911 systems used only CAMA trunks from the 911 tandem access switch that was connected to specialized hardware located at the PSAP. This specialized 911 PSAP equipment, sometimes referred to as an ANI Controller, was capable of receiving the caller's ANI and then querying an ALI database to obtain the caller's identification. PSAP technology has been improved in that the CAMA trunks and ANI Controller have been replaced with 911-formatted ISDN (Integrated Services Digital Network) telephones directly connected to the 911 access tandem, as described in U.S. Pat. No. 5,311,569 to Brozovich et al. for "Line-Based Public Safety Answering Point", issued May 10, 1994.

The availability of the caller's telephone number to the PSAP (the ANI feature) led quickly to providing the caller's name and address as well. This was straightforwardly accomplished using the subscriber information stored by telephone companies based upon telephone number since the 1980's. A computer, often embodied in a personal computer (PC), is used by a PSAP operator (situated at the PSAP answering position) to access an automatic location identifier (ALI) database to obtain location information relating to the caller. Such equipment at the PSAP enabled queries of an Automatic Location Identification (ALI) database using the caller's number provided by the ANI feature to ascertain name and address information. The ALI databases are typically maintained by the respective telephone company serving the PSAP. This was an improvement, but a problem still remained where several telephone company central offices served a town or county. Other problems also developed with the growing volume of mobile callers using wireless phones, satellite phones and communications over the Internet. Information regarding the locus of the origin of the call merely identified the locus where the call entered the wireline network; even such limited location information is not always provided. No indication was presented to identify the geographic location of such mobile callers.

As the situation of multiple central offices serving a PSAP occurred more frequently, it was clear that it was inefficient to build communication trunks from several central offices to a PSAP. As a result the 9-1-1 Tandem was developed. With that equipment, trunks from central offices are concentrated at a tandem office (a 9-1-1 tandem) from which a single trunk group serves a given PSAP. Often a 9-1-1 tandem comprises an otherwise common Class 5 telephone system end office (EO), with added software to configure it for 9-1-1 operations. Such concentration of trunks reduces size and cost of PSAP equipment. The tandem is a telephone company switch that provides an intermediate concentration and switching point. Tandems are used for many purposes, including intra-LATA (Local Access and Transport Area) toll calls, access to other local exchange carriers (LECs), and access to long distance carriers and telephone operators.

A significant development in 9-1-1 services has been the introduction of Enhanced 9-1-1 (E9-1-1). Some of the features of E9-1-1 include Selective Routing, ANI, ALI, Selective Transfer and Fixed Transfer. Selective Transfer enables one-button transfer capability to Police, Fire and EMS (Emergency Medical Service) agencies appropriate for the caller's location listed on the ALI display. Fixed Transfer is analogous to speed dialing.

Selective Routing is a process by which 9-1-1 calls are delivered to a specific PSAP based upon the street address of the caller. Selective Routing Tandems do not directly use address information from the ALI database to execute decisions regarding which PSAP to connect. Recall that emergency services (Police, Fire and EMS) are typically delivered on a municipality basis. Often there will be one Police Department (e.g., municipal, county or state), but there may be several Fire Departments and EMS Agencies. The town will be divided into response areas served by each respective agency. The response areas are overlaid and may be defined as geographic zones served by one particular combination of Police, Fire and EMS agencies. Such zones are referred to as Emergency Service Zones (ESZ). Each ESZ contains the street addresses served by each type of responder. The ESZs are each assigned an identification number (usually 3–5 digits), known as Emergency Service numbers (ESN).

The Assignment of ESZs and corresponding ESNs enables the compilation of selective routing tables. The street addresses are derived from a Master Street Address Guide (MSAG), a database of street names and house number ranges within associated communities defining Emergency Service Zones (ESZs) and their associated Emergency Service Numbers (ESNs). This MSAG enables proper routing of 9-1-1 calls by the 9-1-1 tandem; this is Selective Routing as implemented in a 9-1-1 system. Thus, the telephone company must have an MSAG valid address to be assigned the appropriate ESN for selective routing purposes and that information must be added to the 9-1-1 ALI database. It is by using such information that the selective routing capability of the Selective Routing Tandem can properly route a 9-1-1 call to the correct PSAP. If the information is not available in the ALI database, the record is placed into an error file for further manual handling.

A portion of the ALI database may be loaded into a Selective Routing Data Base (SRDB) for use by the 9-1-1 tandem. The SRDB may be located in the tandem, in an adjunct processor, or in the ALI database.

Reliability is a very important factor considered in designing 9-1-1 systems. One approach to providing reliability is to provide diversely routed trunk groups from each central office to its respective 9-1-1 tandem. Preferably, each trunk group is large enough to carry the entire 9-1-1 traffic load for the respective central office. However, some systems are designed with less than full traffic capacity on trunk groups to "choke" or "congestion manage" incoming calls to a tandem in order to avoid overloading a PSAP. In some arrangements, parallel 9-1-1 tandems are provided so that a central office has capable 9-1-1 tandem ready for use (albeit with 50% call handling capacity) without interruption if one of the 9-1-1 tandems fails. Switched bypass to an alternate 9-1-1 tandem, commonly using digital crossover switches, is another approach to providing reliability in 9-1-1 systems.

Another approach to providing redundancy and robustness for a 9-1-1 system is the employment of Instant Network Backup (INB). Using INB, if a call does not complete to the 9-1-1 network for any reason (e.g., trunk failure, facility problem, 9-1-1 tandem failure or port failure), the INB takes over and completes the call to a predesignated 7- or 10-digit number. Using this INB alternate path, ANI and ALI information are not delivered, but the call is completed to a local public safety agency, usually the local PSAP.

The interface between Operator handled calls and a 9-1-1 system is addressed in several ways. One system provides a direct connection between an Operator tandem and the 9-1-1 tandem. The operator forwards the call with the caller's ANI to the 9-1-1 tandem. The 9-1-1 tandem treats the call as though the caller had dialed the call. A second way to effect the desired interface is by using pseudo numbers. A pseudo number is a number that, when dialed, will reach a specific PSAP as a 9-1-1 call. Pseudo numbers have some special ALI information associated with them; for example, there may be a pseudo number associated with each municipality in a state. Dialing the pseudo number, usually from outside the LATA (Local Access and Transport Area), will generate a 9-1-1 call to the PSAP for that municipality. The ALI display will indicate that it is a third party conference call from an unknown address in that town. The caller is not identified, but the call goes to the PSAP where the caller is believed, or claims, to be. Pseudo numbers are useful for Alternate Local Exchange Carrier (ALEC) or Competitive Local Exchange Carrier (CLEC) operators who may be located anywhere in the country.

A third method for effecting an interface for operator handled calls with a 9-1-1 system is through the public switched telephone network (PSTN), dialing the directory number for the PSAP. This is often referred to as the "back door" number by ALEC and CLEC operators. Besides the delivery of emergency (i.e., 911) calls to a PSAP, other calls (i.e., "back door" calls) must be handled by a PSAP. This is so because some callers choose to call for police, ambulance or other emergency service using a conventional telephone number (usually a 7- or 10-digit phone number) instead of calling 911. Calls to such conventional telephone numbers are routed to a PSAP operator over usual telephone lines (sometimes referred to as "administrative lines") employed for routing such conventional phone calls. Having to be able to answer such calls received over administrative lines has historically required PSAP operators to have a second telephone available to answer such calls. This need for addressing administrative calls (i.e., calls not cast in emergency call 911 format and routed over ANI-capable lines) gave rise to the use of a specialized Private Branch Exchange (PBX) by the PSAP to replace the specialized 911 ANI controller hardware or the ISDN phones connected directly to the 911 tandem. Such employment of a PBX for use by a PSAP is described in U.S. Pat. No. 6,101,240 to Blair et al for "Arrangement for Public Safety Answering Points", issued Aug. 8, 2000. Blair's 911-capable PBX is configured for connection directly with a 911 tandem using CAMA or 911-formatted ISDN trunks and provides many typical PBX Centrex-like functions such as call holding, forwarding, conferencing, and parking found in most commercial PBXs used by businesses today. One additional advantage of Blair's PBX is that "administrative lines" may also be connected to the PBX, thereby allowing the PSAP operator to require only a single phone for handling both types of calls—emergency service 911 calls and administrative calls. Many PSAP installations have employed the Blair 911-capable PBX and find that its employment is cost effective and easier to support as they reduce the diversity of their installed equipment.

The same issues encountered in implementing a 9-1-1 system for identifying user location are also extant in other telecommunication systems where user location (or other locations) is important.

The advent of wireless communications has further exacerbated the difficulty of ascertaining caller location in telecommunication systems. The "patchwork" solutions described above regarding 9-1-1 systems have been mirrored in other special or abbreviated number systems to a significant extent. The "patchwork" solutions have created a capability-limited telecommunication system that cannot ascertain geographic information as fully or as easily as it should for all types of callers. This capability limitation has been especially felt in connection with wireless telephone systems. The system is overly dependent upon human intervention to properly route calls to appropriate receivers, such as a proper PSAP. New modes of communication, such as Voice Over IP (Internet Protocol), further contribute to telecommunication traffic not identifiable regarding geographic origin using present telecommunication routing systems.

It remains that current 911 access tandem equipment used in the United States is only capable of delivering a 911 call to a PSAP using certain trunk types. These trunks types are CAMA, a specific version of ISDN called Custom ISDN BRI (hereinbefore referred to as 911-formatted ISDN) and Enhanced MF. Custom ISDN BRI is only available on certain specific communication switches produced by limited manufacturers. If a PSAP wants to use a PBX to service 911 calls and the selected PBX does not provide telephone trunk support for the specific trunks required for 911 service from 911 tandem equipment (i.e., CAMA, Custom ISDN BRI or Enhanced MF), then the PBX cannot be used. It is desirable for PSAPs to have a single telecommunications vendor solution for all standard telephony needs as well as the handling off 911 calls. Such a single-vendor approach contributes to unity of design, efficiency of operation and economy in replacement parts and other maintenance related expenses. If a vendor cannot provide a PBX configured for connection with a 911 tandem, then this desirable common telecommunications solution cannot be met.

One solution to non-911 compatible PBXs has been to implement a two-PBX solution. A non-911 compatible PBX is used for all general business telephony functions and as the reception point for administrative trunks. A second, 911-compatible PBX or ANI controller is used as the reception point for only 911 lines. The two PBXs are interconnected together using TIE (Telephone Interconnect Equipment) lines such as a T1 line or other data-compatible line. In this configuration, a PSAP operator is disadvantageously required to have two telephones installed at a PSAP answering position: one phone is used for general purpose communications (i.e., administrative calls) and a second, different telephone is used for handling 911 calls. Requiring two PBX's and two phone instruments per answering position as well as requiring extra cabling for connecting all of the required hardware renders this a relatively expensive solution for supporting emergency system 911 calls and administrative calls. Moreover, by not having a single PBX and telephone for both types of calling traffic, the PSAP operator (the human operator manning the PSAP answering position) loses the ability to perform inter-PBX transfers and conferences by simply dialing a 3 or 4-digit extension for the additional party. Typically a full 7 (or 10) digit number must be dialed. When calls are answered on the 911 telephone, the PSAP operator has no ability to use speed dial lists relating to the non-911 PBX. Other functionality such as prioritization of 911 call delivery (ahead of administrative calls) to the PSAP operator and automatic route selection for outgoing calls is also lost by not having a unified PBX capability associated with the call handling equipment at the PSAP answering positions for handling both 911 calls and administrative calls.

Similar limitations will likely occur in other abbreviated number or special number telephone systems handling location-based calls with resulting adverse operational shortcomings. Other such abbreviated number systems include emergency call systems in countries other than the United States, abbreviated number calling systems for reaching telephone maintenance services, abbreviated number calling systems for municipal information and services, and similar systems.

There is a need for an improved telecommunication system and apparatus for providing telephone communication between a caller and a special number call answering facility that can ascertain caller location or other geographic information with less human intervention than is presently required.

There is also a need for an improved telecommunication system and apparatus for providing telephone communication between a caller and a special number call answering facility that can ascertain caller location or other geographic information with less human intervention than is presently required when involving wireless, Internet, satellite or other non-geographically fixed communication technologies.

There is yet a further need for an improved telecommunication system and apparatus for providing telephone communication between a caller and a special number call answering facility that share user location or other geographic information with other call answering stations using PBX-type call handling capabilities.

SUMMARY OF THE INVENTION

A system is for providing communication between a caller and a special number call answering facility including special number call answering positions. Calls are effected in a first special number call format including caller identification information or a second administrative call format not including identification information. The system includes: (a) A first switching apparatus coupled with a special number switch in a network. The first switching apparatus receives a first incoming call in the first call format from the special number switch. The first switching apparatus converts the first incoming call to an interim call cast in an interim call format maintaining the identification information in the second call format. The first switching apparatus presents the interim call at an output locus. (B) A second switching apparatus coupled with the call answering facility, coupled with the first switching apparatus and coupled with at least one administrative number switch in the network. The second switching apparatus receives second incoming calls from the at least one administrative number switch in the second call format. The second switching apparatus distributes the incoming administrative calls among the special number call answering positions. The second switching apparatus receives the interim call from the output locus and distributes the interim call among the special number call answering positions.

It is, therefore, an object of the present invention to provide an improved telecommunication system and apparatus for providing telephone communication between a caller and a special number call answering facility that can ascertain caller location or other geographic information with less human intervention than is presently required.

It is a further object of the present invention to provide an improved telecommunication system and apparatus for providing telephone communication between a caller and a special number call answering facility that can ascertain caller location or other geographic information with less human intervention than is presently required when involving wireless, Internet, satellite or other non-geographically fixed communication technologies.

It is yet a further object of the present invention to provide an improved telecommunication system and apparatus for providing telephone communication between a caller and a special number call answering facility that share user location or other geographic information with other call answering stations using PBX-type call handling capabilities.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 2 is a schematic diagram of a second exemplary prior art system for providing telephone communication between a caller and a 911 call answering facility.

DETAILED DESCRIPTION OF THE PREFERRED EMBODIMENT

Figure 1:
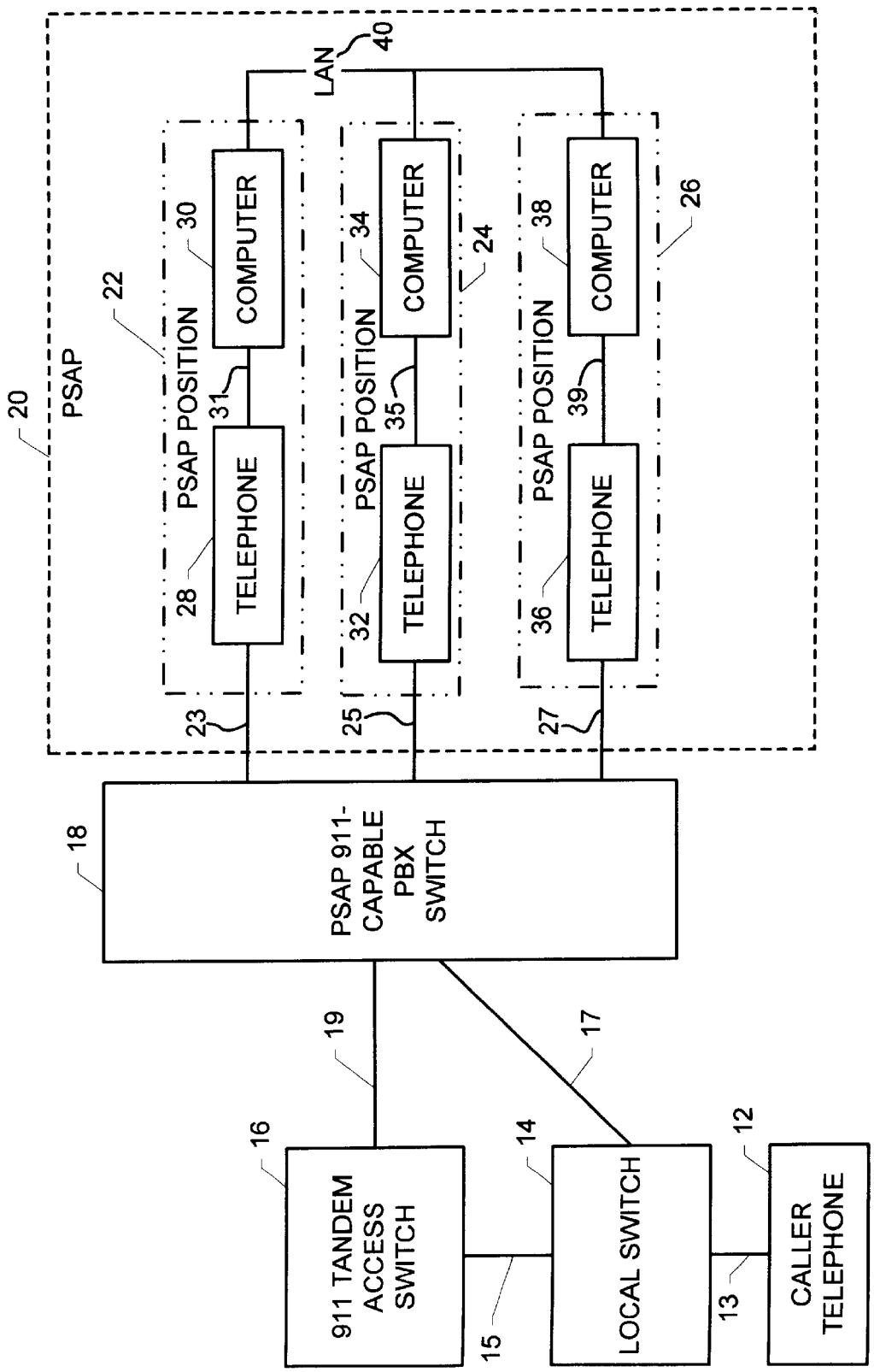
FIG. 1 is a schematic diagram of a first exemplary prior art system for providing telephone communication between a caller and a 911 call answering facility.

FIG. 1 is a schematic diagram of a first exemplary prior art system for providing telephone communication between a caller and a 911 call answering facility. In FIG. 1, a system 10 includes a caller telephone 12 from which telephone calls are originated and a local telephone switch 14 with which caller telephone 12 is connected, as indicated by a line 13. By way of example and not by way of limitation, local telephone switch 14 is part of what is commonly referred to as the Public Switched Telephone Network (PSTN). Among other entities or systems or apparatuses in the PSTN (not shown in detail in FIG. 1) with which local telephone switch 14 may be connected is included a 911 tandem access switch 16. 911 tandem access switch 16 is coupled with local telephone switch 14 (as indicated by a line 15) and receives from local telephone switch 14 any 911 calls originating from caller telephone 12. 911 tandem access switch 16 is coupled with a PSAP 911-capable private branch exchange (PBX) switch 18, as indicated by a line 19. Any 911 calls received by 911 tandem switch 16 that originated from caller telephone 12 are routed by 911 tandem switch 16 to PSAP 911 capable PBX switch 18.

Local telephone switch 14 is also directly linked or coupled with PSAP 911-capable PBX switch 18, as indicated by a line 17. By such a connection, local telephone switch 14 routes non-911 calls (also referred to herein as administrative calls) originated by caller telephone 12 directly to PSAP 911-capable PBX switch 18 without routing such administrative calls via 911 tandem access switch 16.

A significant result of such alternate call routing depending upon the extant call-type is that 911 calls originating from caller telephone 12 arrive at PSAP 911-capable PBX switch 18 in a 911 format (e.g., CAMA format, Enhanced MF format or Custom ISDN BRI format). Such 911 formats contain ANI (automatic number identification) information that includes data relating to identification of caller telephone 12. In contrast, administrative calls originating from caller telephone 12 arrive at PSAP 911-capable PBX switch 18 in a non-911 format with the significant difference being that no ANI data is included with the administrative call.

In exemplary prior art system 10 (FIG. 1) both types of calls from caller telephone 12—911 format calls and administrative calls—are received at PSAP 911-capable PBX switch 18. PSAP 911-capable PBX switch 18 is coupled with a public service answering point (PSAP) 20. PSAP 20 includes a plurality of PSAP answering positions 22, 24, 26. Each PSAP answering position 22, 24, 26 includes a telephone and a computer. Thus, PSAP answering position 22 includes a telephone 28 and a computer 30. PSAP answering position 24 includes a telephone 32 and a computer 34. PSAP answering position 26 includes a telephone 36 and a computer 38. Computers 30, 34, 38 are preferably embodied in personal computers (PCs) and are preferably connected within a local area network (LAN) 40. Preferably telephone 28 is coupled with computer 30 as indicated by a line 31, telephone 32 is coupled with computer 34 as indicated by a line 35, and telephone 26 is coupled with computer 38 as indicated by a line 39. 911-capable PBX switch 18 distributes calls originating from caller telephone 12 that are received via 911 tandem access switch 16 (i.e., 911 formatted calls) and calls received via local telephone switch 14 (i.e., administrative calls) according to predetermined operating criteria among telephones 28, 32, 36 or computers 30, 34, 38, as required, as indicated by lines 23, 25, 27 and LAN 40 (details of connection with LAN 40 not shown in FIG. 1).

Figure 2:
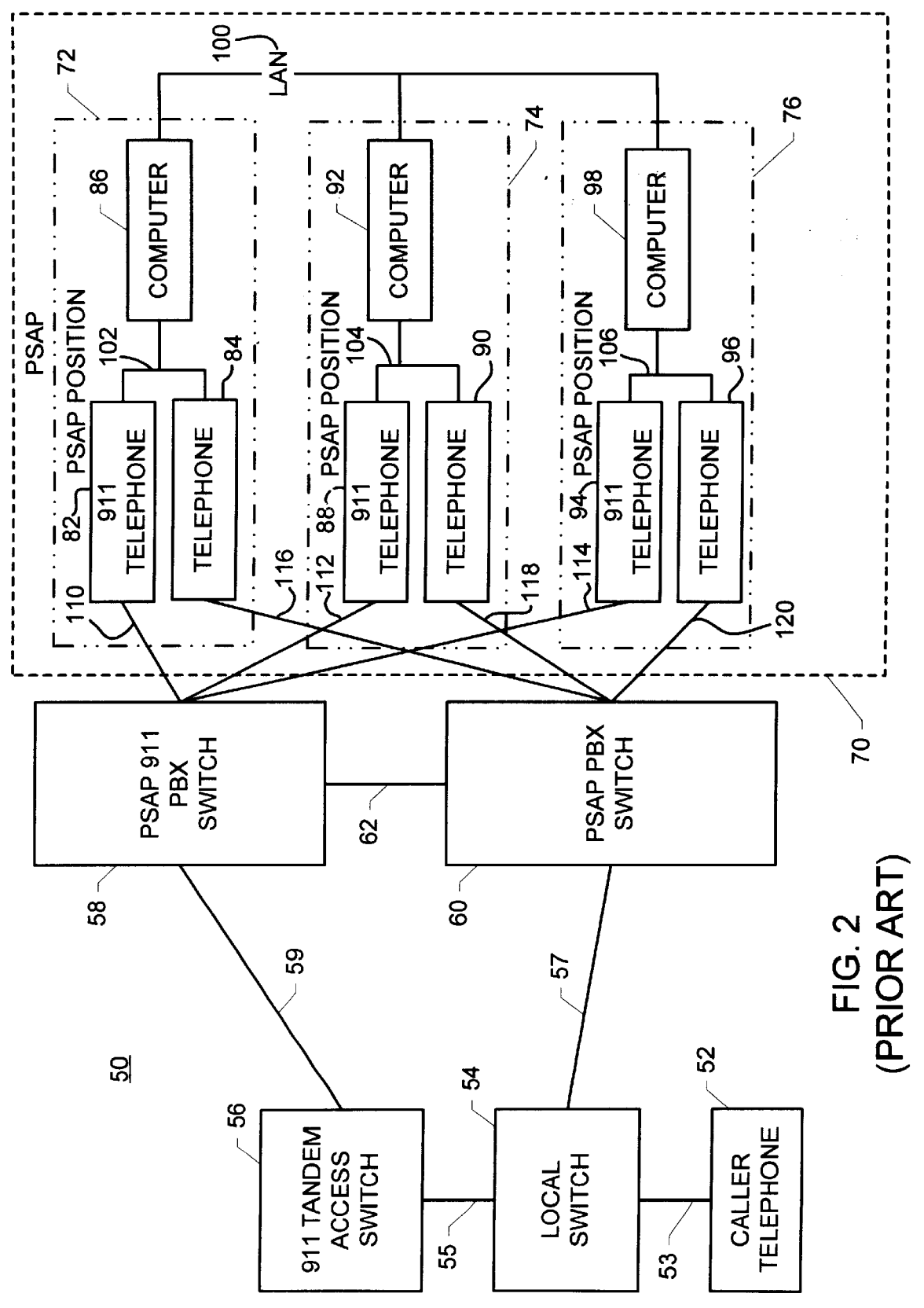

FIG. 2 is a schematic diagram of a second exemplary prior art system for providing telephone communication between a caller and a 911 call answering facility. In FIG. 2, a system 50 includes a caller telephone 52 from which telephone calls are originated and a local telephone switch 54 with which caller telephone 52 is connected, as indicated by a line 53. By way of example and not by way of limitation, local telephone switch 54 is part of what is commonly referred to as the Public Switched Telephone Network (PSTN). Among other entities or systems or apparatuses in the PSTN (not shown in detail in FIG. 2) with which local telephone switch 54 may be connected is included a 911 tandem access switch 56. 911 tandem access switch 56 is coupled with local telephone switch 54 (as indicated by a line 55) and receives from local telephone switch 54 any 911 calls originating from caller telephone 52. 911 tandem access switch 56 is coupled with a PSAP 911-capable private branch exchange (PBX) switch 58, as indicated by a line 59. Any 911 calls received by 911 tandem switch 56 that originated from caller telephone 52 are routed by 911 tandem switch 56 to PSAP 911-capable PBX switch 58.

Local telephone switch 54 is coupled with PSAP PBX switch 60, as indicated by a line 57. PSAP PBX switch 60 is not 911-capable; PSAP PBX switch 60 handles only non-911 calls—i.e., administrative calls. By such a connection (line 57) local telephone switch 54 routes non-911 calls (administrative calls) originated by caller telephone 52 to PSAP PBX switch 60 without routing such administrative calls via 911 tandem access switch 56 or via PSAP 911-capable PBX switch 58.

A significant result of such alternate call routing depending upon the extant call-type is that 911 calls originating from caller telephone 52 arrive at PSAP 911-capable PBX switch 58 in a 911 format (e.g., CAMA format, Enhanced MF format or Custom ISDN BRI format). Such 911 formats contain ANI (automatic number identification) information that includes data relating to identification of caller telephone 52. In contrast, administrative calls originating from caller telephone 52 arrive at PSAP PBX switch 60 in a non-911 format with the significant difference being that no ANI data is guaranteed to be included with the administrative call.

An interswitch line 62 is provided connecting PSAP 911-capable PBX switch 58 with PSAP PBX switch 60. Preferably interswitch line 62 is a T1 high speed data line.

PSAP 911-capable PBX switch 58 and PSAP PBX switch 60 are coupled with a public service answering point (PSAP) 70. PSAP 70 includes a plurality of PSAP answering positions 72, 74, 76. Each PSAP answering position 72, 74, 76 includes a 911 telephone, an administrative call (i.e., non-911-capable) telephone and a computer. Thus, PSAP answering position 72 includes a 911 telephone 82, an administrative call telephone 84 and a computer 86. PSAP answering position 74 includes a 911 telephone 88, an administrative call telephone 90 and a computer 92. PSAP answering position 76 includes a 911 telephone 94, an administrative call telephone 96 and a computer 98. Computers 86, 92, 98 are preferably embodied in personal computers (PCs) and are preferably connected within a local area network (LAN) 100. Preferably 911 telephone 82 and administrative call telephone 84 are coupled with computer 86 as indicated by an interconnecting arrangement 102, 911 telephone 88 and administrative call telephone 90 are coupled with computer 92 as indicated by an interconnecting arrangement 104, and 911 telephone 94 and administrative call telephone 96 are coupled with computer 98 as indicated by an interconnecting arrangement 106.

PSAP 911-capable PBX switch 58 distributes calls originating from caller telephone 52 that are received via 911 tandem access switch 56 (i.e., 911 formatted calls) according to predetermined operating criteria among 911 telephones 82, 88, 94 via lines 110, 112, 114. PSAP PBX switch 60 distributes calls originating from caller telephone 52 that are received via local telephone switch 54 (i.e., administrative calls) according to predetermined operating criteria among administrative call telephones 84, 90, 96 via lines 116, 118, 120. Distribution of selected information or data from either PSAP 911-capable PBX switch 58 or PSAP PBX switch 60 may be effected to computers 86, 92, 98, as required via a respective 911 telephone 82, 88, 94 or administrative call telephone 84, 90, 96 and an associated interconnecting arrangement 102, 104, 106 or directly via LAN 100 (details of connection with LAN 100 not shown in FIG. 2).

Certain selected information or data may be passed between PSAP 911-capable PBX switch 58 and PSAP PBX switch 60 via interswitch line 62. However ANI data received in 911 calls by PSAP 911-capable PBX switch 58 from 911 tandem access switch 56 is lost in transferring a call from PSAP 911-capable PBX switch 58 to PSAP PBX switch 60 via interswitch line 62 because administrative calls handled by administrative call telephones 84, 90, 96 do recognize ANI information in their signaling format. Moreover, some PBX-type features are lost in transferring calls via interswitch line 62 including, for example, performing inter-PBX transfers and conferences using 3- or 4-digit party extensions, speed dial lists associated with one PBX may not be available for use by the other PBX, automatic route selection for outgoing calls may not be available.

Some 911 tandem access switch functions may not be available in system 50 (FIG. 2). For example, over-trunk conferencing returning over a 911 trunk from PSAP 911-capable PBX switch 58 (e.g., line 59; FIG. 2) may not be available without using up other trunks within PSAP 70. Transfer of 911 calls over a non-91 I trunk (thereby freeing a 911 trunk for later emergency calls) may not be available in system 50. Performing selective, fixed or dialed digit transfers from 911 tandem access switch 56 may not be available in system 50.

Figure 3:
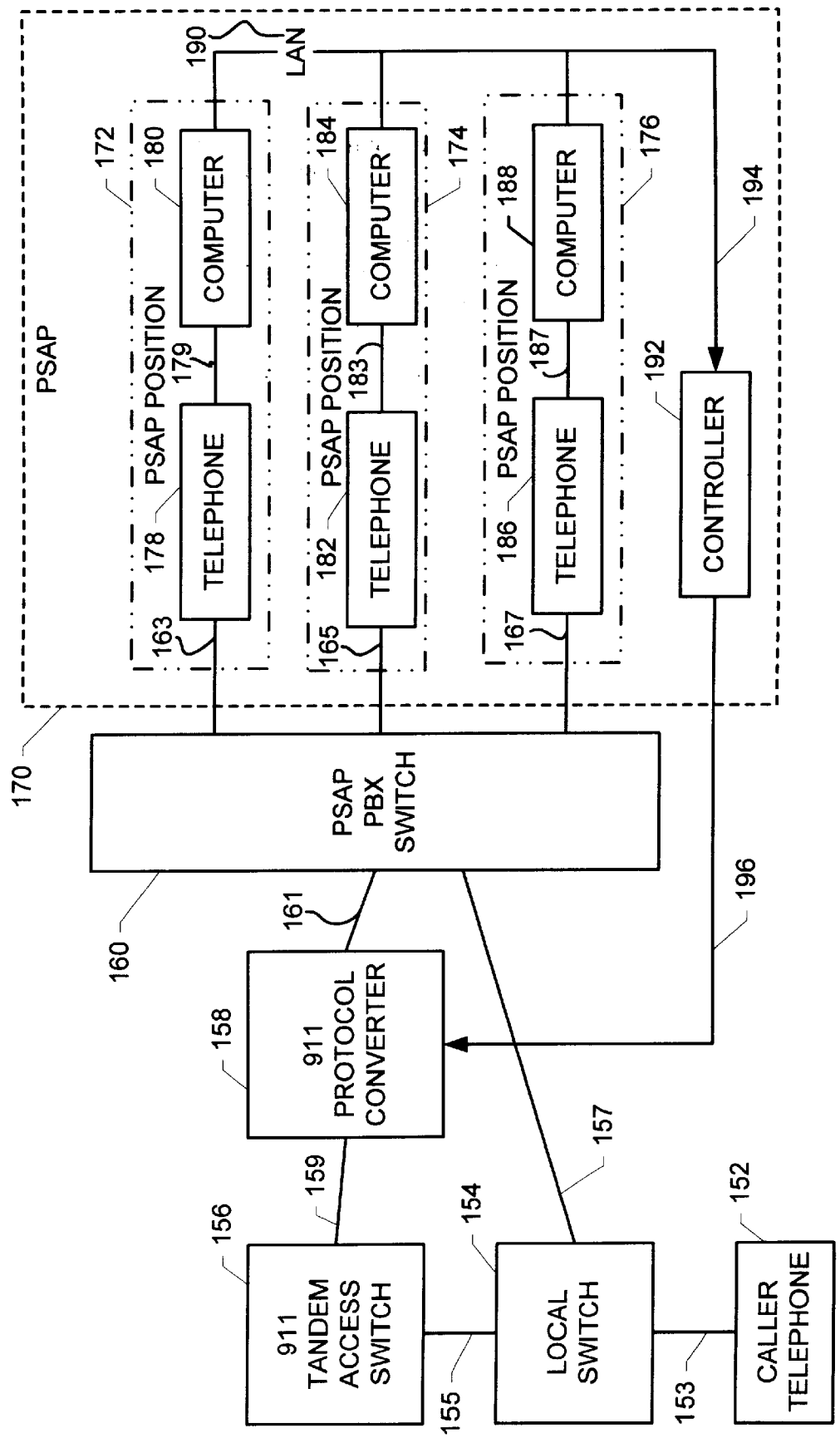
FIG. 3 is a schematic diagram of the preferred embodiment of the system of the present invention for providing telephone communication between a caller and a 911 call answering facility.

FIG. 3 is a schematic diagram of the preferred embodiment of the system of the present invention for providing telephone communication between a caller and a 911 call answering facility. In FIG. 3, a system 150 includes a caller telephone 152 from which telephone calls are originated and a local telephone switch 154 with which caller telephone 152 is connected, as indicated by a line 153. By way of example and not by way of limitation, local telephone switch 154 is part of what is commonly referred to as the Public Switched Telephone Network (PSTN). Among other entities or systems or apparatuses in the PSTN (not shown in detail in FIG. 3) with which local telephone switch 154 may be connected is included a 911 tandem access switch 156. 911 tandem access switch 156 is coupled with local telephone switch 154 (as indicated by a line 155) and receives from local telephone switch 154 any 911 calls originating from caller telephone 152. 911 tandem access switch 156 is coupled with a 911-to-PSAP protocol converter 158. 911 protocol converter 158 receives calls from 911 tandem access switch 156 via line 159 that are formatted in a 911 format (e.g., CAMA, Enhanced MF or Custom ISDN BRI format). Recall that an important distinction of such 911 formatted calls is that they contain ANI information that permits PSAP operators to access ALI databases and provides a call back capability for the PSAP to use in calling back a caller who may not be able to respond to PSAP operator queries or because of some other incapacity. 911 protocol converter 158 converts the received 911 call to a format that is amenable to handling by a PSAP PBX switch. 911 protocol converter 158 is connected with a PSAP PBX switch 160 via a line 161. In its preferred embodiment, 911 protocol converter 158 (described in greater detail in connection with FIG. 6) converts 911 formatted calls to a format compatible with ISDN PRI (Integrated Services Digital Network Primary Rate Interface) trunking. ISDN PRI format is amenable to handling by PSAP private branch exchange (PBX) switch 160, retaining a capability for full PBX functionality such as transfers and conferences using 3- or 4-digit party extensions, speed dial lists, and automatic route selection.

Any 911 calls received by 911 tandem switch 156 that originated from caller telephone 152 are routed by 911 tandem switch 156 to 911 protocol converter 158. Local telephone switch 154 is coupled with PSAP PBX switch 160, as indicated by a line 157. PSAP PBX switch 160 is not 911-capable; PSAP PBX switch 160 handles only non-911 calls—i.e., administrative calls. By such a connection (line 157) local telephone switch 154 routes non-911 calls (administrative calls) originated by caller telephone 152 to PSAP PBX switch 160 without routing such administrative calls via 911 tandem access switch 156 or via 911 protocol converter 158.

A significant result of such alternate call routing depending upon the extant call-type is that 911 calls originating from caller telephone 152 arrive at 911 protocol converter 158 in a 911 format (e.g., CAMA format, Enhanced MF format or Custom ISDN BRI format). Such 911 formats contain ANI (automatic number identification) information that includes data relating to identification of caller telephone 152. In contrast, administrative calls originating from caller telephone 152 arrive at PSAP PBX switch 160 in a non-911 format with the significant difference being that no ANI data is guaranteed to be included with the administrative call. 911 protocol converter 158 converts the received 911-formatted calls to a format that can be handled by PSAP PBX switch 160 (preferably ISDN PRI format) while retaining ANI information and providing full PBX capability treatment of the converted calls.

PSAP PBX switch 160 is coupled with a public service answering point (PSAP) 170. PSAP 170 includes a plurality of PSAP answering positions 172, 174, 176. Each PSAP answering position 172, 174, 176 includes a telephone and a computer. In system 150 there is no requirement for two telephone instruments for each respective PSAP answering position 172, 174, 176 because only one type of phone call format is provided to PSAP answering positions 172, 174, 176. This is so because 911 formatted calls are converted by 911 protocol converter 158 to a call format that is amenable to handling by PSAP PBX switch 160. Thus, PSAP answering position 172 includes a telephone 178 and a computer 180. PSAP answering position 174 includes a telephone 182 and a computer 184. PSAP answering position 176 includes a telephone 186 and a computer 188. Computers 180, 184, 188 are preferably embodied in personal computers (PCs) and are preferably connected within a local area network (LAN) 190. Preferably telephone 178 is coupled with computer 180 as indicated by a line 179, telephone 182 is coupled with computer 184 as indicated by a line 183, and telephone 186 is coupled with computer 188 as indicated by a line 187.

PSAP PBX switch 160 distributes calls originating from caller telephone 152 that are received via 911 tandem access switch 156 (i.e., 911 formatted calls) and 911 protocol converter 158, as well as calls received via local telephone switch 154, according to predetermined operating criteria among telephones 178, 182, 186 via lines 163, 165, 167. Distribution of selected information or data from PSAP PBX switch 160 may be effected to computers 180, 184, 188 as required via a respective telephone 178, 182, 186 and an associated interconnecting arrangement 179, 183, 187 or directly via LAN 190 (details of connection with LAN 190 not shown in FIG. 3).

911 protocol converter 158 is coupled with a controller 192 within PSAP 170 via a line 196. Preferably line 196 establishes a CTI (Computer Telephone Integration) interface between 911 protocol converter 158 and controller 192. Controller 192 is preferably connected with LAN 190 (as indicated by a line 194) but may be coupled with an individual computer 180, 184, 188. Controller 192 effects control of operation of 911 protocol converter 158 including which 911 formats are accommodated by 911 protocol converter 158, which output format is employed by 911 protocol converter 158, and other call handling functions provided by or in conjunction with 911 protocol converter 158. In the preferred embodiment of system 150 which input 911 format is accommodated and which output format is used by 911 protocol converter 158 are predetermined and unalterably established in 911 protocol converter 158 during its manufacture or during its installation. Providing a CTI interface between controller 192 and 911 protocol converter 158 permits provision of certain call handling capabilities for system 150 including, for example, over-trunk conferencing returning over a 911 trunk (e.g., line 159) without using up other trunks within PSAP 170, transfer of 911 calls over a non-911 trunk (e.g., line 157) and thereby freeing a 911 trunk for later emergency calls, and performing selective, fixed or dialed digit transfers from 911 tandem access switch 156.

Figure 4:
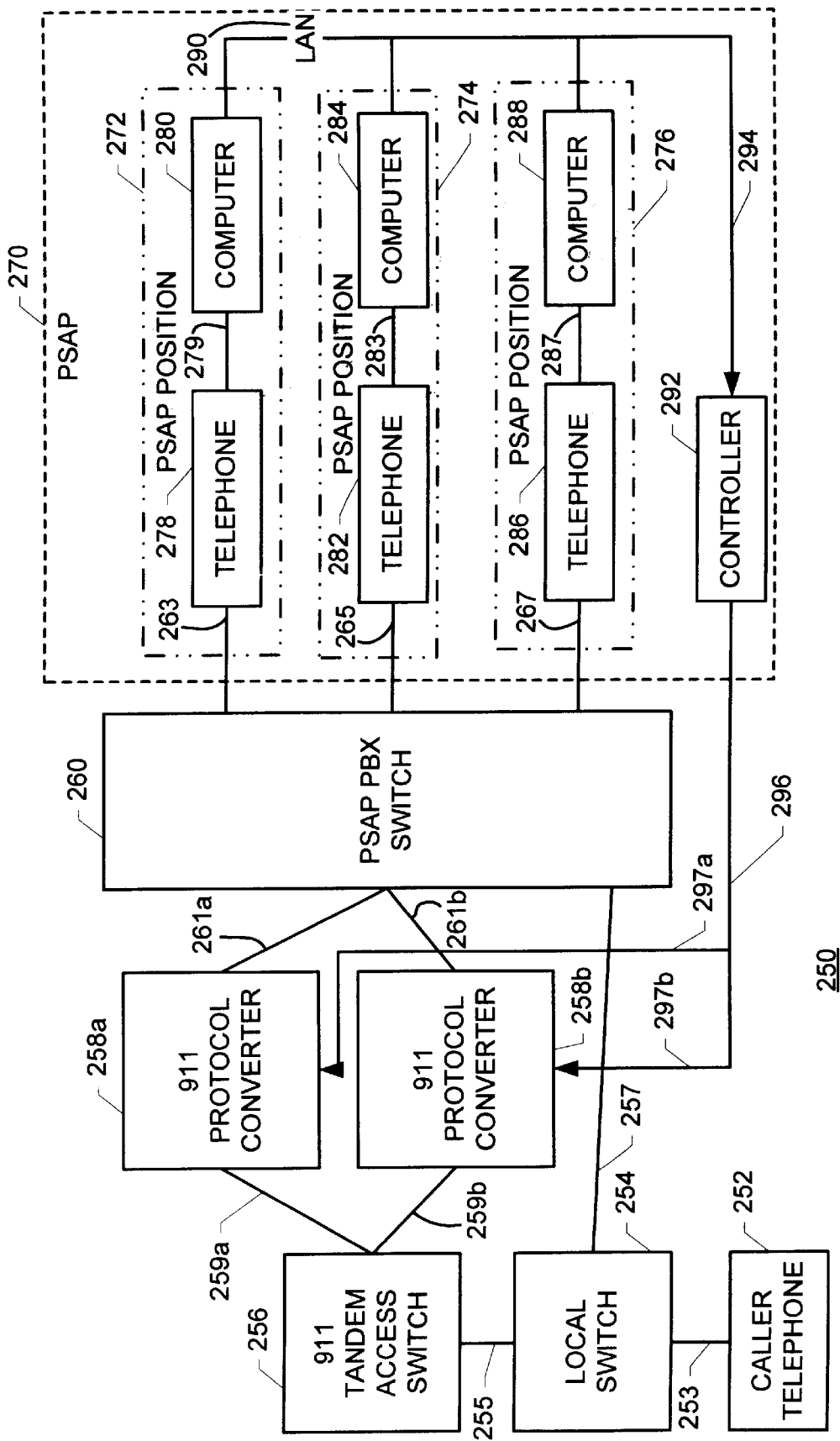
FIG. 4 is a schematic diagram of a second embodiment of the system of the present invention for providing telephone communication between a caller and a 911 call answering facility.

FIG. 4 is a schematic diagram of a second embodiment of the system of the present invention for providing telephone communication between a caller and a 911 call answering facility. In FIG. 4, a system 250 includes a caller telephone 252 from which telephone calls are originated and a local telephone switch 254 with which caller telephone 252 is connected, as indicated by a line 253. By way of example and not by way of limitation, local telephone switch 254 is part of what is commonly referred to as the Public Switched Telephone Network (PSTN). Among other entities or systems or apparatuses in the PSTN (not shown in detail in FIG. 4) with which local telephone switch 254 may be connected is included a 911 tandem access switch 256. 911 tandem access switch 256 is coupled with local telephone switch 254 (as indicated by a line 255) and receives from local telephone switch 254 any 911 calls originating from caller telephone 252. 911 tandem access switch 256 is coupled with a first 911-to-PSAP protocol converter 258a and with a second 911-to-PSAP protocol converter 258b. First 911 protocol converter 258a receives calls from 911 tandem access switch 256 via line 259a and second 911 protocol converter 258b receives calls from 911 tandem access switch 256 via line 259b; those calls are formatted in a 911 format (e.g., CAMA, Enhanced MF or Custom ISDN BRI format). First 911 protocol converter 258a and second 911 protocol converter 258b convert the received 911 calls to a format that is amenable to handling by a PSAP PBX switch. First 911 protocol converter 258a and second 911 protocol converter 258b are connected with a PSAP PBX switch 260 via lines 261a, 261b. In the preferred embodiment of system 250, first 911 protocol converter 258a and second 911 protocol converter 258b (described in greater detail in connection with FIG. 6) convert 911 formatted calls to a format compatible with ISDN PRI (Integrated Services Digital Network Primary Rate Interface) trunking. ISDN PRI format is amenable to handling by PSAP private branch exchange (PBX) switch 260, retaining a capability for full PBX functionality such as transfers and conferences using 3- or 4-digit party extensions, speed dial lists, and automatic route selection.

Any 911 calls received by 911 tandem switch 256 that originated from caller telephone 252 are routed by 911 tandem switch 256 to at least one of first 911 protocol converter 258a and second 911 protocol converter 258b. Local telephone switch 254 is coupled with PSAP PBX switch 260, as indicated by a line 257. PSAP PBX switch 260 is not 911-capable; PSAP PBX switch 260 handles only non-911 calls—i.e., administrative calls. By such a connection (line 257) local telephone switch 254 routes non-911 calls (administrative calls) originated by caller telephone 252 to PSAP PBX switch 260 without routing such administrative calls via 911 tandem access switch 256 or via first 911 protocol converter 258a or second 911 protocol converter 258b.

A significant result of such alternate call routing depending upon the extant call-type is that 911 calls originating from caller telephone 252 arrive at first 911 protocol converter 258a or second 911 protocol converter 258b in a 911 format (e.g., CAMA format, Enhanced MF format or Custom ISDN BRI format). Such 911 formats contain ANI (automatic number identification) information that includes data relating to identification of caller telephone 252. In contrast, administrative calls originating from caller telephone 252 arrive at PSAP PBX switch 260 in a non-911 format with the significant difference being that no ANI data is guaranteed to be included with the administrative call. First 911 protocol converter 258a and second 911 protocol converter 258b convert the received 911-formatted calls to a format that can be handled by PSAP PBX switch 260 (preferably ISDN PRI format) while retaining ANI information and providing full PBX capability treatment of the converted calls.

PSAP PBX switch 260 is coupled with a public service answering point (PSAP) 270. PSAP 270 includes a plurality of PSAP answering positions 272, 274, 276. Each PSAP answering position 272, 274, 276 includes a telephone and a computer. In system 250 there is no requirement for two telephone instruments for each respective PSAP answering position 272, 274, 276 because only one type of phone call format is provided to PSAP answering positions 272, 274, 276. This is so because 911 formatted calls are converted by first 911 protocol converter 258a and second 911 protocol converter 258b to a call format that is amenable to handling by PSAP PBX switch 260. Thus, PSAP answering position 272 includes a telephone 278 and a computer 280. PSAP answering position 274 includes a telephone 282 and a computer 284. PSAP answering position 276 includes a telephone 286 and a computer 288. Computers 280, 284, 288 are preferably embodied in personal computers (PCs) and are preferably connected within a local area network (LAN) 290. Preferably telephone 278 is coupled with computer 280 as indicated by a line 279, telephone 282 is coupled with computer 284 as indicated by a line 283, and telephone 286 is coupled with computer 288 as indicated by a line 287.

PSAP PBX switch 260 distributes calls originating from caller telephone 252 that are received via 911 tandem access switch 256 (i.e., 911 formatted calls) and at least one of first 911 protocol converter 258a and second 911 protocol converter 258b, as well as calls received via local telephone switch 254, according to predetermined operating criteria among telephones 278, 282, 286 via lines 263, 265, 267. Distribution of selected information or data from PSAP PBX switch 260 may be effected to computers 280, 284, 288 as required via a respective telephone 278, 282, 286 and an associated interconnecting arrangement 279, 283, 287 or directly, via LAN 290 (details of connection with LAN 290 not shown in FIG. 4).

First 911 protocol converter 258a is coupled with a controller 292 within PSAP 270 via lines 297a, 296. Second 911 protocol converter 258b is coupled with a controller 292 within PSAP 270 via lines 297b, 296. Preferably lines 296, 297a, 297b establish CTI (Computer Telephone Integration) interfaces among first 911 protocol converter 258a, second 911 protocol converter 258b and controller 292. Controller 292 is preferably connected with LAN 290 (as indicated by a line 294) but may be coupled with an individual computer 280, 284, 288. Controller 292 effects control of operation of first 911 protocol converter 258a and second 911 protocol converter 258b including which 911 formats are accommodated by first 911 protocol converter 258a and second 911 protocol converter 258b, which output format is employed by first 911 protocol converter 258a and second 911 protocol converter 258b, and other call handling functions provided by or in conjunction with first 911 protocol converter 258a and second 911 protocol converter 258b. Also included among the functions of controller 292 are load leveling or distribution of traffic handling responsibilities between first 911 protocol converter 258a and second 911 protocol converter 258b. Which input 911 format is accommodated and which output format is used by first 911 protocol converter 258a and second 911 protocol converter 258b may differ for each of first 911 protocol converter 258a and second 911 protocol converter 258b. In the preferred embodiment of system 250 which input 911 format is accommodated and which output format is used by first 911 protocol converter 258a and second 911 protocol converter 258b are predetermined and unalterably established in first 911 protocol converter 258a and second 911 protocol converter 258b during their manufacture or during their installation. Providing a CTI interface between controller 292 and first 911 protocol converter 258a and second 911 protocol converter 258b permits provision of certain call handling capabilities for system 250 including, for example, over-trunk conferencing returning over a 911 trunk (e.g., lines 259a, 259b) without using up other trunks within PSAP 270, transfer of 911 calls over a non-911 trunk (e.g., line 257) and thereby freeing a 911 trunk for later emergency calls, and performing selective, fixed or dialed digit transfers from 911 tandem access switch 256.

Figure 5:
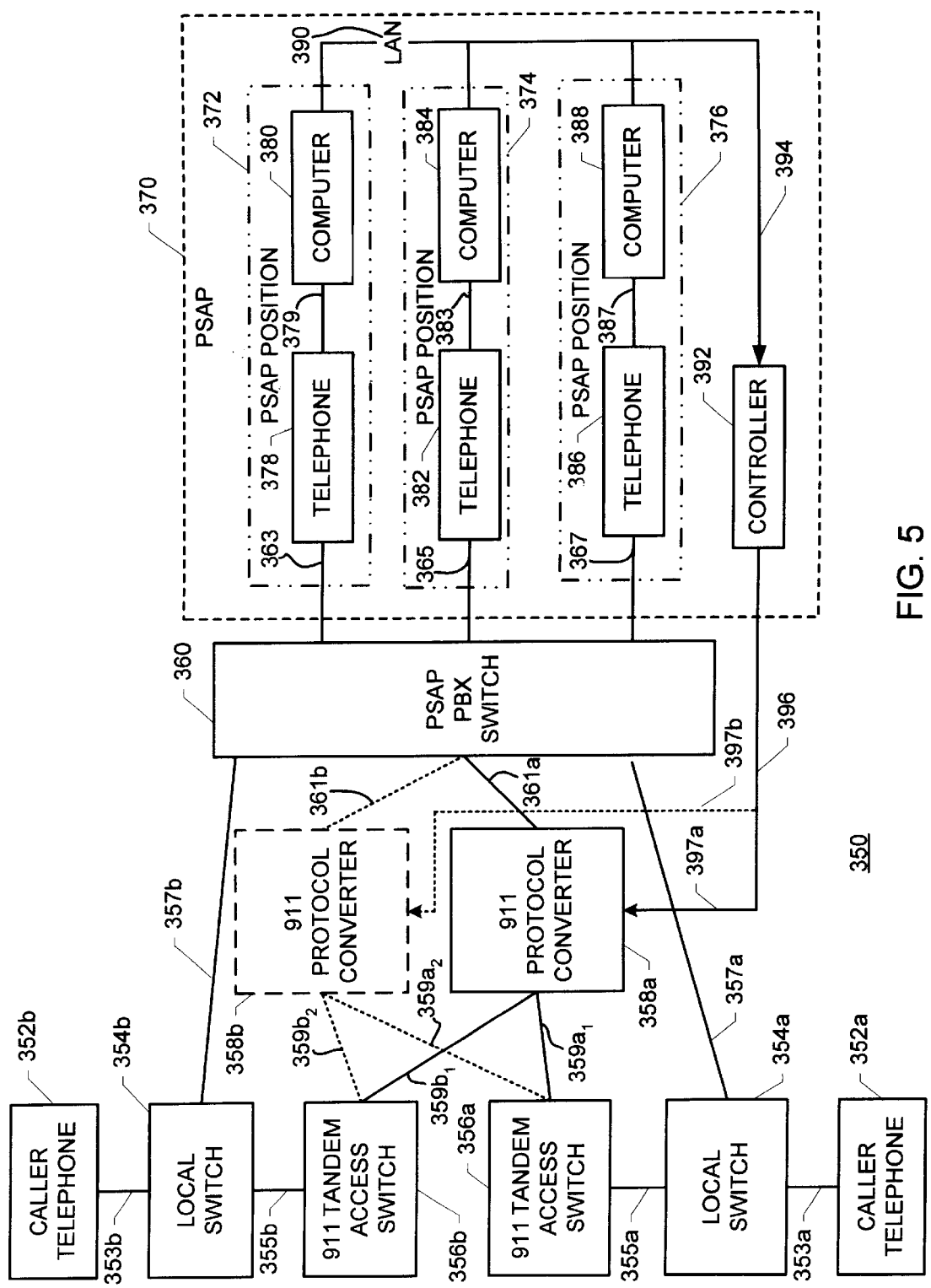
FIG. 5 is a schematic diagram of a third embodiment of the system of the present invention for providing telephone communication between a caller and a 911 call answering facility.

FIG. 5 is a schematic diagram of a third embodiment of the system of the present invention for providing telephone communication between a caller and a 911 call answering facility. In FIG. 5, a system 350 includes caller telephones 352a, 352b from which telephone calls are originated and local telephone switches 354a, 354b with which caller telephones 352a, 352b are connected, as indicated by a lines 353a, 353b. By way of example and not by way of limitation, local telephone switches 354a, 354b are part of what is commonly referred to as the Public Switched Telephone Network (PSTN). Among other entities or systems or apparatuses in the PSTN (not shown in detail in FIG. 5) with which local telephone switches 354a, 354b may be connected are included 911 tandem access switches 356a, 356b. 911 tandem access switches 356a, 356b are coupled with local telephone switch 354a, 354b (as indicated by lines 355a, 355b) and receive from local telephone switch 354a, 354b any 911 calls originating from caller telephones 352a, 352b. 911 tandem access switches 356a, 356b are coupled with a first 911-to-PSAP protocol converter 358a. First 911 protocol converter 358a receives calls from 911 tandem access switches 356a, 356b via lines $359a_1, 359b_1$. A second 911 protocol converter 358b is illustrated in dotted line format indicating that it is optional for system 350. 911 tandem access switches 356a, 356b may also be coupled with second 911-to-PSAP protocol converter 358b, as indicated by dotted lines $359a_2, 359b_2$. Dotted lines $359a_2, 359b_2$ indicate an optional connection arrangement.

Calls received by 911 protocol converters 358a, 358b from 911 tandem access switches 356a, 356b are formatted in a 911 format (e.g., CAMA, Enhanced MF or Custom ISDN BRI format). First 911 protocol converter 358a and second 911 protocol converter 358b (when employed) convert the received 911 calls to a format that is amenable to handling by a PSAP PBX switch. 911 protocol converters 358a, 358b are connected with a PSAP PBX switch 360 via lines 361a, 361b. In the preferred embodiment of system 350, first 911 protocol converter 358a and second 911 protocol converter 358b (when employed) convert 911 formatted calls to a format compatible with ISDN PRI (Integrated Services Digital Network Primary Rate Interface) trunking. ISDN PRI format is amenable to handling by PSAP private branch exchange (PBX) switch 360, retaining a capability for full PBX functionality such as transfers and conferences using 3- or 4-digit party extensions, speed dial lists, and automatic route selection.

Any 911 calls received by 911 tandem switches 356a, 356b that originated from caller telephones 352a, 352b are routed by 911 tandem switches 356a, 356b to at least one of 911 protocol converters 358a, 358b. Local telephone switches 354a, 354b are coupled with PSAP PBX switch 360, as indicated by lines 357a, 357b. PSAP PBX switch 360 is not 911-capable; PSAP PBX switch 360 handles only non-911 calls—i.e., administrative calls. By such connections (line 357a, 357b) local telephone switches 354a, 354b route non-911 calls (administrative calls) originated by caller telephones 352a, 352b to PSAP PBX switch 360 without routing such administrative calls via 911 tandem access switches 356a, 356b or via 911 protocol converters 358a, 358b.

A significant result of such alternate call routing depending upon the extant call-type is that 911 calls originating from caller telephones 352a, 352b arrive at 911 protocol converters 358a, 358b in a 911 format (e.g., CAMA format, Enhanced MF format or Custom ISDN BRI format). Such 911 formats contain ANI (automatic number identification) information that includes data relating to identification of caller telephones 352a, 352b. In contrast, administrative calls originating from caller telephones 352a, 352b arrive at PSAP PBX switch 360 in a non-911 format with the significant difference being that no ANI data is guaranteed to be included with the administrative call. 911 protocol converters 358a, 358b convert the received 911-formatted calls to a format that can be handled by PSAP PBX switch 360 (preferably ISDN PRI format) while retaining ANI information and providing full PBX capability treatment of the converted calls.

PSAP PBX switch 360 is coupled with a public service answering point (PSAP) 370. PSAP 370 includes a plurality of PSAP answering positions 372, 374, 376. Each PSAP answering position 372, 374, 376 includes a telephone and a computer. In system 350 there is no requirement for two telephone instruments for each respective PSAP answering position 372, 374, 376 because only one type of phone call format is provided to PSAP answering positions 372, 374, 376. This is so because 911 formatted calls are converted by 911 protocol converters 358a, 358b to a call format that is amenable to handling by PSAP PBX switch 360. Thus, PSAP answering position 372 includes a telephone 378 and a computer 380. PSAP answering position 374 includes a telephone 382 and a computer 384. PSAP answering position 376 includes a telephone 386 and a computer 388. Computers 380, 384, 388 are preferably embodied in personal computers (PCs) and are preferably connected within a local area network (LAN) 390. Preferably telephone 378 is coupled with computer 380 as indicated by a line 379, telephone 382 is coupled with computer 384 as indicated by a line 383, and telephone 386 is coupled with computer 388 as indicated by a line 387.

PSAP PBX switch 360 distributes calls originating from caller telephones 352a, 352b that are received via 911 tandem access switches 356a, 356b (i.e., 911 formatted calls) and at least one of 911 protocol converters 358a, 358b, as well as calls received via local telephone switches 354a, 354b, according to predetermined operating criteria among telephones 378, 382, 386 via lines 363, 365, 367. Distribution of selected information or data from PSAP PBX switch 360 may be effected to computers 380, 384, 388 as required via a respective telephone 378, 382, 3286 and an associated interconnecting line 379, 383, 387 or directly via LAN 390 (details of connection with LAN 390 not shown in FIG. 5).

First 911 protocol converter 358a is coupled with a controller 392 within PSAP 370 via lines 397a, 396. Second 911 protocol converter 358b is coupled with controller 392 3 via lines 397b, 396. Line 397b is indicated in dotted line format to reflect that including 911 protocol converter 358b in system 350 is optional. Preferably lines 396, 397a, 397b establish CTI (Computer Telephone Integration) interfaces among 911 protocol converters 358a, 358b and controller 392. Controller 392 is preferably connected with LAN 390 (as indicated by a line 394) but may be coupled with an individual computer 380, 384, 388. Controller 392 effects control of operation of 911 protocol converters 358a, 358b including which 911 formats are accommodated by 911 protocol converters 358a, 358b, which output format is employed by 911 protocol converters 358a, 358b, and other call handling functions provided by or in conjunction with 911 protocol converters 358*a*, 358*b*. Also included among the functions of controller 392 are load leveling or distribution of traffic handling responsibilities between 911 protocol converters 358*a*, 358*b*. Which input 911 format is accommodated and which output format is used by 911 protocol converters 358*a*, 358*b* may differ for each 911 protocol converter 358*a*, 358*b*. In the preferred embodiment of system 350 which input 911 format is accommodated and which output format are used by a respective 911 protocol converter 358*a*, 358*b* are predetermined and unalterably established in 911 protocol converters 358*a*, 358*b* during their manufacture or during their installation. Providing a CTI interface between controller 392 and 911 protocol converters 358*a*, 358*b* permits provision of certain call handling capabilities for system 350 including, for example, over-trunk conferencing returning over a 911 trunk (e.g., lines 359*$a_n$*, 359*$b_n$*) without using up other trunks within PSAP 370, transfer of 911 calls over a non-911 trunk (e.g., lines 357*a*, 357*b*) and thereby freeing a 911 trunk for later emergency calls, and performing selective, fixed or dialed digit transfers from 911 tandem access switches 356*a*, 356*b*.

Figure 6:
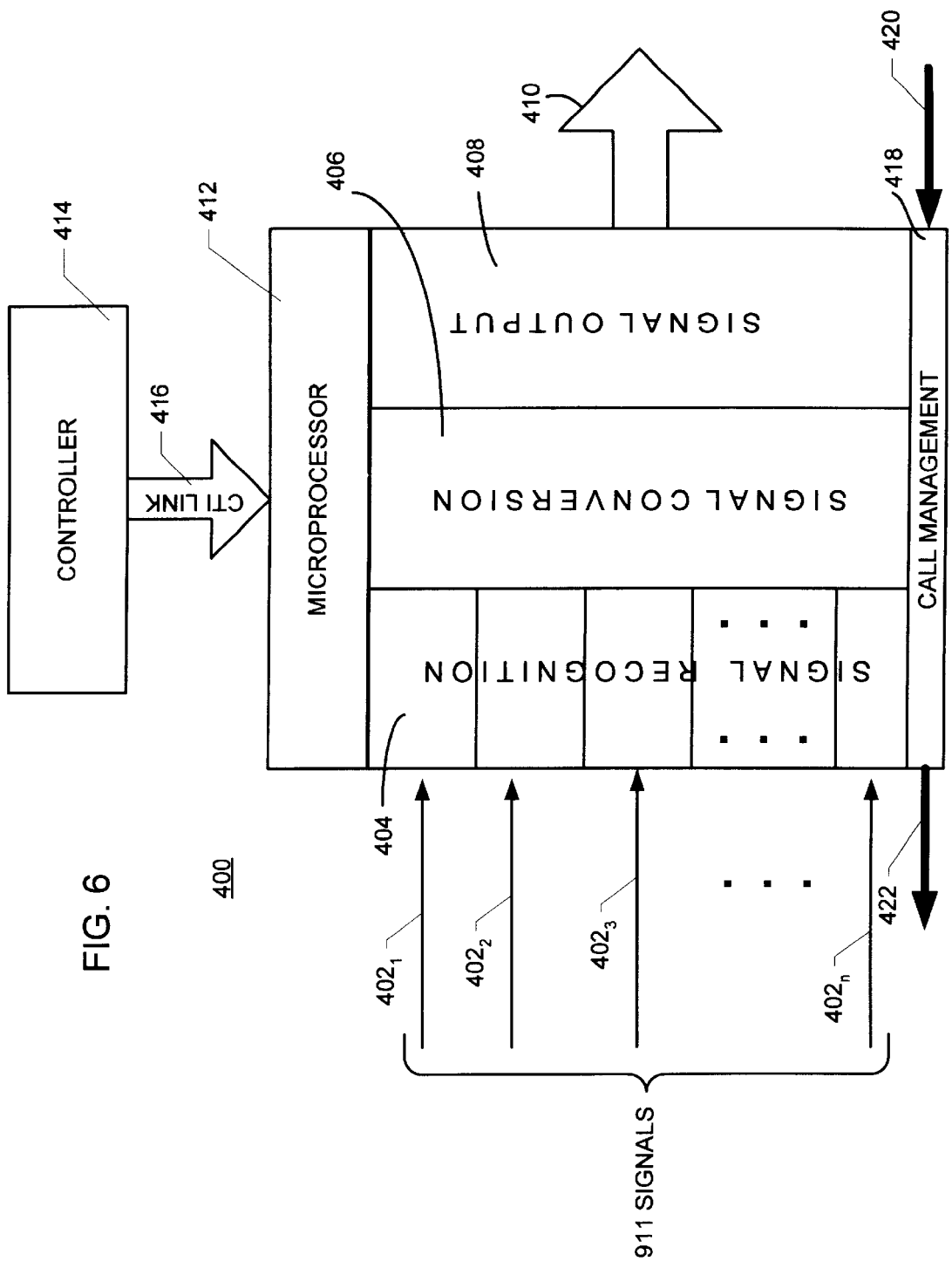
FIG. 6 is a schematic diagram of the preferred embodiment of the apparatus of the present invention for providing telephone communication between a caller and a 911 call answering facility.

FIG. 6 is a schematic diagram of the preferred embodiment of the apparatus of the present invention for providing telephone communication between a caller and a 911 call answering facility. In FIG. 6, a 911 protocol conversion apparatus 400 receives incoming 911-formatted calls via a plurality of incoming lines 402$_1$, 402$_2$, 402$_3$, 402$_n$. Respective incoming lines 402$_n$ may each deliver a 911 call in a different 911 format or respective incoming line 402$_n$ may each deliver incoming 911 calls in the same 911 format. 911 protocol conversion apparatus 400 includes a signal recognition section 404 coupled with incoming lines 402$_n$ for receiving incoming 911 calls from respective incoming lines 402$_n$ and recognizing the respective 911 format associated with a respective communication signal arriving via a respective incoming line 402$_n$. 911 protocol conversion apparatus 400 also includes a signal conversion section 406 coupled with signal recognition section 404. Signal conversion section 406 effects conversion of a received signal from a 911 format (e.g., CAMA, Enhanced MF or Custom ISDN BRI format) to a format that can accommodate conveying ANI information and can be handled by a non-911 capable private branch exchange (PBX) switch without sacrificing PBX call handling functionality or losing the ANI information. 911 protocol conversion apparatus 400 further includes a signal output section 408 coupled with signal conversion section 406 for presenting output signals (preferably in ISDN PRI format) at an output locus 410 for use by other components, such as a PSAP PBX switch (e.g., PSAP PBX switch 160, FIG. 3; PSAP PBX switch 260, FIG. 4; PSAP PBX switch 360, FIG. 5. Not shown in FIG. 6). A control section 412 (preferably embodied in a microprocessor) is included in 911 protocol conversion apparatus 400. Control section 412 is coupled with signal processing section 404, with signal conversion section 406 and with signal output section 408 for ensuring proper and coordinated operation of signal processing section 404, signal conversion section 406 and signal output section 408.

A controller 414 is coupled with 911 protocol conversion apparatus 400 preferably via a CTI link 416 for coordinating operation of 911 protocol conversion apparatus 400 with other devices, such as a PSAP PBX switch (not shown in FIG. 6). This is similar to the CTI links to controllers described in connection with FIG. 3 (CTI link 296, controller 192), FIG. 4 (CTI link 296, 297*a*, 297*b*; controller 292) and FIG. 5 (CTI link 396, 397*a*, 397*b*; controller 392).

A call management section 414 is also preferably included in 911 protocol conversion apparatus 400 for cooperating with controller 418 and CTI link 416 to facilitate certain call handling capabilities regarding return calls (indicated by arrows 420, 422) for a system employing 911 protocol conversion apparatus 400 including, for example, over-trunk conferencing returning over a 911 trunk without using up other trunks within an associated PSAP, transfer of 911 calls over a non-911 trunk and thereby freeing a 911 trunk for later emergency calls, and performing selective, fixed or dialed digit transfers from 911 tandem access switches coupled within a system employing 911 protocol conversion apparatus 400. This beneficial aspect of using a 911 protocol conversion apparatus linked with a controller by a CTI link has been described herein in connection with system 150 (FIG. 3), system 250 (FIG. 4) and system 350 (FIG. 5).

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A system for providing telephone communication between a caller and a special number call answering facility; said special number call answering facility including at least one special number call answering position; calls from said caller being effected in one of a first call format or a second call format; said first call format being a special number format including identification information relating to identification of said caller; said second call format being an administrative call format not including said identification information; the system comprising:

(a) a first communication switching apparatus; said first communication switching apparatus being coupled with at least one special number communication switch in a telephone network; said first communication switching apparatus receiving a first incoming call in said first call format from said at least one special number communication switch; said first communication switching apparatus converting said first incoming call to an interim special number call; said interim special number call being cast in an interim call format; said interim call format maintaining said identification information in said second call format; said first communication switching apparatus presenting said interim special number call at an output locus; and (b) a second communication switching apparatus; said second communication switching apparatus being coupled with said special number call answering facility, coupled with said first communication switching apparatus and coupled with at least one administrative number communication switch in said telephone network; said second communication switching apparatus receiving second incoming calls from said at least one administrative number communication switch in said second call format; said second communication switching apparatus distributing said incoming administrative calls among said at least one special number call answering position; said second communication switching apparatus receiving said interim special number call from said output locus and distributing said interim special number call among said at least one special number call answering position.

2. A system for providing telephone communication between a caller and a special number call answering facility as recited in claim 1 wherein said first communication switching apparatus includes a signal recognition section for recognizing said first call format; a signal conversion section for converting said first call format to said second call format while maintaining said identification information in said second call format; and a signal output section for effecting said presenting said interim special number call at said output locus.

3. A system for providing telephone communication between a caller and a special number call answering facility as recited in claim 2 wherein said special number call answering facility includes a controller device; said controller device being coupled with said first communication switching apparatus for effecting control of said first communication switching device from said special number call answering facility.

4. A system for providing telephone communication between a caller and a special number call answering facility as recited in claim 1 wherein said second communication switching apparatus is configured for exercising a second call format suite of call-handling capabilities for said second call format; said second call format suite of call-handling capabilities enabling said second communication switching apparatus to selectively connect respective calling stations in said telephone network and in said special number call answering facility for carrying out calling arrangements using said second call format; and wherein said first communication switching apparatus includes a call management section; said call management section configuring said first communication switching apparatus for exercising a first call format suite of call-handling capabilities for said interim call format; said first call format suite of call-handling capabilities enabling said first communication switching apparatus to selectively connect respective calling stations in said telephone network and in said special number call answering facility for carrying out return calling arrangements using said interim call format.

5. A system for providing telephone communication between a caller and a special number call answering facility as recited in claim 1 wherein said special number call answering facility includes a controller device; said controller device being coupled with said first communication switching apparatus for effecting control of said first communication switching device from said special number call answering facility.

6. A system for providing telephone communication between a caller and a special number call answering facility as recited in claim 2 wherein said second communication switching apparatus is configured for exercising a second call format suite of call-handling capabilities for said second call format; said second call format suite of call-handling capabilities enabling said second communication switching apparatus to selectively connect respective calling stations in said telephone network and in said special number call answering facility for carrying out calling arrangements using said second call format; and wherein said first communication switching apparatus includes a call management section; said call management section configuring said first communication switching apparatus for exercising a first call format suite of call-handling capabilities for said interim call format; said first call format suite of call-handling capabilities enabling said first communication switching apparatus to selectively connect respective calling stations in said telephone network and in said special number call answering facility for carrying out return calling arrangements using said interim call format.

7. A system for providing telephone communication between a caller and a special number call answering facility as recited in claim 3 wherein said second communication switching apparatus is configured for exercising a second call format suite of call-handling capabilities for said second call format; said second call format suite of call-handling capabilities enabling said second communication switching apparatus to selectively connect respective calling stations in said telephone network and in said special number call answering facility for carrying out calling arrangements using said second call format; and wherein said first communication switching apparatus includes a call management section; said call management section configuring said first communication switching apparatus for exercising a first call format suite of call-handling capabilities for said interim call format; said first call format suite of call-handling capabilities enabling said first communication switching apparatus to selectively connect respective calling stations in said telephone network and in said special number call answering facility for carrying out return calling arrangements using said interim call format.

8. A system for providing telephone communication between a caller and a special number call answering facility as recited in claim 5 wherein said second communication switching apparatus is configured for exercising a second call format suite of call-handling capabilities for said second call format; said second call format suite of call-handling capabilities enabling said second communication switching apparatus to selectively connect respective calling stations in said telephone network and in said special number call answering facility for carrying out calling arrangements using said second call format; and wherein said first communication switching apparatus includes a call management section; said call management section configuring said first communication switching apparatus for exercising a first call format suite of call-handling capabilities for said interim call format; said first call format suite of call-handling capabilities enabling said first communication switching apparatus to selectively connect respective calling stations in said telephone network and in said special number call answering facility for carrying out return calling arrangements using said interim call format.

9. An apparatus for providing special number telephone communication between a caller and a special number call answering facility; said special number call answering facility including at least one special number call answering position and a facility communication switching apparatus coupled with said at least one special number call answering position; calls from said caller being effected in one of a first call format or a second call format; said first call format being a special number format including identification information relating to identification of said caller; said second call format being an administrative call format not including said identification information; said facility communication switching apparatus being coupled with at least one administrative number communication switch in a telephone network; the apparatus comprising: a special number communication switching device coupled with at least one special number communication switch in said telephone network and coupled with said facility communication switching apparatus; said special number communication switching device receiving a special number incoming call in said first call format from said at least one special number communication switch; said special number communication switching device converting said special number incoming call to an interim special number call; said interim special number call being cast in an interim call format; said interim call format maintaining said identification information in said second call format; said special number communication switching apparatus presenting said interim special number call at an output locus; said facility communication switching apparatus being coupled with said special number communication switching apparatus; said facility communication switching apparatus receiving an administrative incoming call from said at least one administrative number communication switch in said second call format; said facility communication switching apparatus distributing said administrative incoming administrative call among said at least one special number call answering position; said facility communication switching apparatus receiving said interim special number call from said output locus and distributing said interim special number call among said at least one special number call answering position.

10. An apparatus for providing special number telephone communication between a caller and a special number call answering facility as recited in claim 9 wherein said special number communication switching apparatus includes a signal recognition section for recognizing said first call format; a signal conversion section for converting said first call format to said second call format while maintaining said identification information in said second call format; and a signal output section for effecting said presenting said interim special number call at said output locus.

11. An apparatus for providing special number telephone communication between a caller and a special number call answering facility as recited in claim 10 wherein said special number call answering facility includes a controller device; said controller device being coupled with said special number communication switching apparatus for effecting control of said first communication switching device from said special number call answering facility.

12. An apparatus for providing special number telephone communication between a caller and a special number call answering facility as recited in claim 9 wherein said facility communication switching apparatus is configured for exercising a second call format suite of call-handling capabilities for said second call format; said second call format suite of call-handling capabilities enabling said facility communication switching apparatus to selectively connect respective calling stations in said telephone network and in said special number call answering facility for carrying out calling arrangements using said second call format; and wherein said special number communication switching apparatus includes a call management section; said call management section configuring said special number communication switching apparatus for exercising a first call format suite of call-handling capabilities for said interim call format; said first call format suite of call-handling capabilities enabling said special number communication switching apparatus to selectively connect respective calling stations in said telephone network and in said special number call answering facility for carrying out return calling arrangements using said interim call format.

13. An apparatus for providing special number telephone communication between a caller and a special number call answering facility as recited in claim 9 wherein said special number call answering facility includes a controller device; said controller device being coupled with said special number communication switching apparatus for effecting control of said special number communication switching device from said special number call answering facility.

14. An apparatus for providing special number telephone communication between a caller and a special number call answering facility as recited in claim 10 wherein said facility communication switching apparatus is configured for exercising a second call format suite of call-handling capabilities for said second call format; said second call format suite of call-handling capabilities enabling said facility communication switching apparatus to selectively connect respective calling stations in said telephone network and in said special number call answering facility for carrying out calling arrangements using said second call format; and wherein said special number communication switching apparatus includes a call management section; said call management section configuring said special number communication switching apparatus for exercising a first call format suite of call-handling capabilities for said interim call format; said first call format suite of call-handling capabilities enabling said special number communication switching apparatus to selectively connect respective calling stations in said telephone network and in said special number call answering facility for carrying out return calling arrangements using said interim call format.

15. An apparatus for providing special number telephone communication between a caller and a special number call answering facility as recited in claim 11 wherein said facility communication switching apparatus is configured for exercising a second call format suite of call-handling capabilities for said second call format; said second call format suite of call-handling capabilities enabling said facility communication switching apparatus to selectively connect respective calling stations in said telephone network and in said special number call answering facility for carrying out calling arrangements using said second call format; and wherein said special number communication switching apparatus includes a call management section; said call management section configuring said special number communication switching apparatus for exercising a first call format suite of call-handling capabilities for said interim call format; said first call format suite of call-handling capabilities enabling said special number communication switching apparatus to selectively connect respective calling stations in said telephone network and in said special number call answering facility for carrying out return calling arrangements using said interim call format.

16. An apparatus for providing special number telephone communication between a caller and a special number call answering facility as recited in claim 13 wherein said facility communication switching apparatus is configured for exercising a second call format suite of call-handling capabilities for said second call format; said second call format suite of call-handling capabilities enabling said facility communication switching apparatus to selectively connect respective calling stations in said telephone network and in said special number call answering facility for carrying out calling arrangements using said second call format; and wherein said special number communication switching apparatus includes a call management section; said call management section configuring said special number communication switching apparatus for exercising a first call format suite of call-handling capabilities for said interim call format; said first call format suite of call-handling capabilities enabling said special number communication switching apparatus to selectively connect respective calling stations in said telephone network and in said special number call answering facility for carrying out return calling arrangements using said interim call format.

17. A system for providing telephone communication between a caller and a special number call answering facility; said special number call answering facility including at least one special number call answering position; calls from said caller being effected in one of a first call format or a second call format; said first call format being a special number format including identification information relating to identification of said caller; said second call format being an administrative call format not including said identification information; the system comprising:

(a) at least one first communication switching apparatus; said at least one first communication switching apparatus being coupled with at least one special number communication switch in a telephone network; said at least one first communication switching apparatus receiving a first incoming call in said first call format from said at least one special number communication switch; said at least one first communication switching apparatus converting said first incoming call to an interim special number call; said interim special number call being cast in an interim call format; said interim call format maintaining said identification information in said second call format; said at least one first communication switching apparatus presenting said interim special number call at at least one output locus; and (b) At least one second communication switching apparatus; said at least one second communication switching apparatus being coupled with said special number call answering facility, coupled with said at least one first communication switching apparatus and coupled with at least one administrative number communication switch in said telephone network; said at least one second communication switching apparatus receiving second incoming calls from said at least one administrative number communication switch in said second call format; said at least one second communication switching apparatus distributing said incoming administrative calls among said at least one special number call answering position; said at least one second communication switching apparatus receiving said interim special number call from said at least one output locus and distributing said interim special number call among said at least one special number call answering positions.

* * * * *